United States Patent Office 3,541,195
Patented Nov. 17, 1970

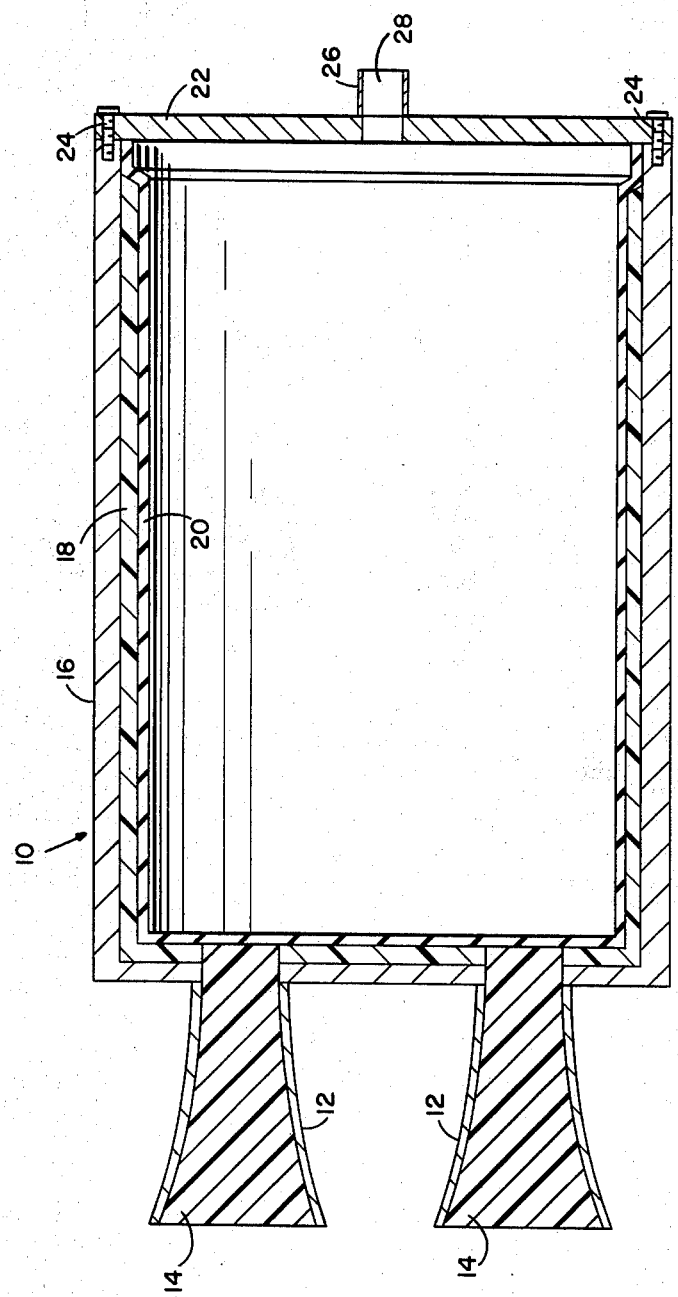
Stanley E. Anderson
Bernard L. Thompson,
INVENTORS.

3,541,195
METHOD FOR MOLDING INSULATION MATERIALS
Stanley E. Anderson, Huntsville, and Bernard L. Thompson, Toney, Ala., assignors, by mesne assignments, to the United States of America as represented by the Secretary of the Army
Filed Nov. 27, 1968, Ser. No. 779,334
Int. Cl. B29g 1/00
U.S. Cl. 264—94
8 Claims

ABSTRACT OF THE DISCLOSURE

Method for molding insulation materials on the inner surface of hollow bodies comprising the steps of placing insulation materials to the inner surface of the hollow body to be insulated, coating the inner surface of the insulation materials with silicone rubber, curing the silicone rubber, pressurizing the hollow body, curing the insulation materials with heat, depressurizing the hollow body, and stripping silicone rubber from cured insulation material on the inner surface of the hollow body.

BACKGROUND OF THE INVENTION

This invention relates to a method for insulating hollow bodies, and in particular, hollow bodies such as rocket motor cases using asbestos-phenolic type insulation.

In the past, asbestos-phenolic insulation has been molded in place in the complex aft-end closure of a flight-type rocket motor using preformed rubber bags. Also, such insulation has been molded by bonding pre-molded parts (made with matched-metal dies) in place with adhesives. Both of these methods are relatively expensive, require long lead-times, and are impractical for rapid demonstrations of principles or the production of very limited numbers of items. In particular, the use of a preformed rubber bag required that the manufacture of such a bag obtain the drawing thereof and tool-up for the manufacture of the bag. Furthermore, very complex shapes or very large parts are difficult to form by these methods. Thus, a need exists for an improved method of molding insulation materials.

Accordingly, it is the principal object of this invention to provide an improved method for molding insulation materials.

It is a particular object of this invention to provide a method which can be employed to produce articles having complex shapes, variable sizes, and in limited quantities as desired for experimental or commercial applications requiring short lead-time to insulate and produce articles.

More particularly, an object of this invention is to provide a method for molding by compressing and curing asbestos-phenolic insulation materials by using an elastic membrane to exert a force maintained by fluid pressure to the elastic membrane.

SUMMARY OF THE INVENTION

Asbestos-phenolic insulation materials can be molded in a flight-type rocket motor using an organosilicon polymer, such as a silicone rubber to form an in place membrane. The method involves pressing insulation materials, such as mats, firmly in place, coating the surface of the insulation layer formed thereby with a thick layer of silicone rubber and curing the rubber at room temperature. The resulting silicone rubber forms a fluid tight membrane when cured. The fluid tight membrane is pressurized to compress the insulation, and the system is cured at 300° F. After cure, the silicone rubber is stripped (such as by peeling), from the insulation layer surface. The silicone rubber must be heat-resistant and have no solvent to diffuse into the insulation. The silicone rubber must vulcanize at room temperature or at temperatures slightly above room temperature.

BRIEF DESCRIPTION OF THE DRAWING

These and other objects and attendant advantages of this invention will become more readily apparent and easily understood by reference to the following detailed description, considered in conjunction with the accompanying drawing, which forms an integral part thereof.

In the drawing, the single figure is a cross-sectional view of a rocket motor being manufactured in accordance with this invention.

DESCRIPTION OF THE PREFERRED EMBODIMENTS

Referring to the figure, a rocket motor 10 is shown having nozzles 12 and plugs 14 plugging the nozzle openings at the aft end of rocket motor 10. Rocket motor 10 has an outer skin 16, an insulation layer 18 inside outer skin 16, and a thick layer 20 (about ⅛-inch) of silicone rubber inside insulation layer 18.

A plate 22 is bolted to the front end of rocket 10 by means of bolts 24. An O-ring (not shown) is employed to make an air-tight fit. A connection 26 communicates with an orifice 28 through the front end of rocket motor 10. Connection 26 communicates at the other end thereof with a pressurizing source (not shown).

The method of this invention involves pressing either asbestos-phenolic insulation mats or other suitable insulation blends and types firmly in place on the inner surface of the outer skin 16 (with plugs 14 inserted and plate 22, and connection 26 removed). This is normally done by hand. The inner surface of plugs 14 and the exposed inner surface of the insulation layer 18 is then coated (as by painting) with a layer of silicone rubber. The silicone rubber layer is applied preferably, about ⅛-inch thick. The layer of rubber should well cover all of the exposed asbestos layer surfaces so that a fluid tight membrane (bag) will be formed. The silicone rubbers used in this invention contain organosilicon polymers. Examples of silicone rubbers useful in the method of this invention are those sold under the General Electric trademarks "RTV–30" and "RTV–60," and those types sold under the Dow-Corning trademark "Silastic." RTV (room temperature vulcanizing) type rubbers are available with a consistency from easily pourable liquids to stiff pastes. The described rubbers useful in this invention polymerize or cure under catalytic reactions at about room temperature after addition of the catalyst supplied for use with the rubber. Organotin compositions are suitable catalysts for curing the silicone rubbers applicable to this invention. A preferred organotin composition is dibutyltin dilaurate (sold under Metal and Thermit Corporation's trademark "Thermolite 12"). The The preferred catalyst is a high boiling, slightly yellow, oily liquid; B.P. 400° F. (10 mm.). The specified silicone rubbers (and others useful in the method of this invention) must have certain properties such as: must be heat-resistant, have elastic properties when cured, and must have no solvent to diffuse into the insulation when used as specified in this invention. The silicone rubbers selected must be easily releasable from the insulation after cure. The rubber is cured (at room temperature or slightly above) as evidenced by the elastic properties noted. During the curing cycle (usually up to about 12 hours is ample time for the curing cycle), the silicone rubber layer 20 forms an elastic fluid tight membrane (bag) which is in itimate contact with the base insulating materials. The time for cure is not critical and naturally will vary according to such factors as the consistency of the starting material, the size article being insulated and the thickness of the rubber layer, amount of catalyst used, and the like. Although the time required for silicone rubber cure is not critical, experience teaches that a predetermined amount of time required to polymerize the silicone rubber should be determined (for obvious reasons) for each system being insulated in accordance with this invention. This procedure will permit maximum efficiency for production quantities. Longer waiting time between the silicone rubber cure cycle and pressurization and setting cycle causes no problems; however, the pressurization and setting cycle can proceed as soon as the silicone rubber cures to a rubbery state.

The entire rocket motor 10 is then pressurized (to superatmospheric pressure) via the pressurizing source, thereby compressing the insulation layer 18. The pressurization is accomplished by admitting a fluid to exert a fluid force to insulation layer. Air, steam, or inert gases are acceptable fluids for use in this invention. Nitrogen gas is preferred and especially advantageous to use where the components of the system may be affected by reactions with oxygen. At higher curing temperatures the inert gas would render another advantage with respect to safety requirements. The amount of pressure applied to the silicone rubber membrane is not critical, but the pressure should be sufficient to maintain the insulation layer 18 firmly in place, and in contact with the rocket motor outer skin 16 while curing of the base insulation material is accomplished. The curing temperature is selected according to the type of insulation materials used. The embodiment comprised of asbestos-phenolic insulation mats is cured in the range of 250° F. to 350° F. A preferred temperature of 300° F. is used for curing the preferred embodiment. The insulation layer 18 is cured by heating while the rocket motor is maintained under superatmospheric pressure by a suitable fluid media.

The conditions for heating will vary substantially depending on the size rocket motor being insulated. No extensive discussion is given for curing the thermosetting material since the standard manner of curing is used and is generally known by those skilled in the art. The two variables, time and temperature, to accomplish the cure may vary according to the requirements of the system.

The time required for cure and the temperature selected for cure is dependent on the system. Since the silicone rubber used to construct the membrane is operative over the range of $-65°$ F. to $600°$ F., a wide range of curing temperatures can be selected to fit commonly used types of substrates such as polybutadiene acrylonitrile, polyurethane, and other synthetic elastomers in conjunction with fillers, such as colloidal silica-asbestos fiber and phenolic microspheres to improve erosion and to lower the thermal conductivity. The material selected should be compatible with the silicone rubber. Polymeric materials, such as phenolic resins or epoxy resins, reinforced with silica cloth, glass cloth, carbon cloth or asbestos cloth are examples of materials compatible with the silicone rubber used in this invention. These reinforcing materials are quite useful in this invention, and their use permits the fabrication of complex, curved structures by retaining the desired contours of the insulation surfaces during the curing cycle.

The finished article made in accordance with this invention was a tactical flight-weight solid propellant rocket motor having two nozzle openings and a very complex structure. Method of compressing and curing the insulation in place proved highly successful. A rapid evaluation of the capability of asbestos-phenolic insulation was accomplished for an application where lead-time for bag or die manufacture and procurement was not available. The elastic silicone rubber membrane made in accordance with this invention compressed, by means of fluid pressure, the base insulation material during cure. After cure, the silicone rubber was easily stripped or peeled from the insulation surface. The insulation quality was good as proven by actual test-firings of the rocket motors using the part.

This method of setting and curing insulation material is contemplated as being useful for insulation requirements of many regular or irregular shaped hollow bodies, not necessarily, rocket motors. The claims have been drawn to include the spirit of this invention.

What is claimed is:
1. A method of molding a layer of thermosetting insulation material upon the inner surface of a hollow body, comprising:
   (a) placing a layer of thermosetting insulation material upon the inner surface of said hollow body;
   (b) coating said layer of insulation material with a layer of an uncured organosilicon-polymer devoid of solvent diffusion into said insulation, said uncured polymer being curable at substantially room temperature, heat resistant at the curing temperature of said thermosetting insulation, compatible with said thermosetting insulation, and easily releasable from said thermosetting insulation layer after cure;
   (c) permitting said layer of uncured polymer to cure by catalytic reactions and form an elastic membrane covering said thermosetting insulation material layer;
   (d) applying fluid pressure against said formed elastic membrane to press said membrane against said insulating layer to compress same against the inner surface of said hollow body; and
   (e) applying heat to cure and set said compressed insulation material against said hollow body inner surface.
2. Method in accordance with claim 1, including the steps of thereafter removing said fluid pressure and said elastic membrane from said thermosetting insulation layer.
3. Method in accordance with claim 1 and wherein said elastic membrane is constituted essentially of a polymerizable substance capable when polymerized of withstanding temperatures of the order of from $-65°$ to $600°$ F.
4. Method in accordance with claim 1 and wherein said thermosetting insulation material is phenolic resin cured at a temperature of about 300° F.
5. Method in accordance with claim 4 and wherein said thermosetting insulation material contains colloidal silica-asbestos fiber as a filler.
6. Method in accordance with claim 1 and wherein said fluid pressure is applied by a fluid selected from at least one of the fluids consisting of air, steam, and inert gases, and wherein said fluid is at superatmospheric pressure.
7. Method in accordance with claim 1 and wherein said thermosetting insulation material contains at least one of the reinforcing materials consisting of silica cloth, glass cloth, carbon cloth, and asbestos cloth.
8. Method in accordance with claim 1 and wherein said catalytic reactions are accomplished by means of organotin compositions.

References Cited
UNITED STATES PATENTS

| 3,128,322 | 4/1964 | Young | 264—314 |
| 3,428,725 | 2/1969 | Delmonte et al. | 264—226 |

ROBERT F. WHITE, Primary Examiner

J. R. HALL, Assistant Examiner

U.S. Cl. X.R.
264—219, 255, 314